July 5, 1955  G. E. BATCHELDER  2,712,461
ROTARY SHAFT SEAL
Filed May 28, 1952
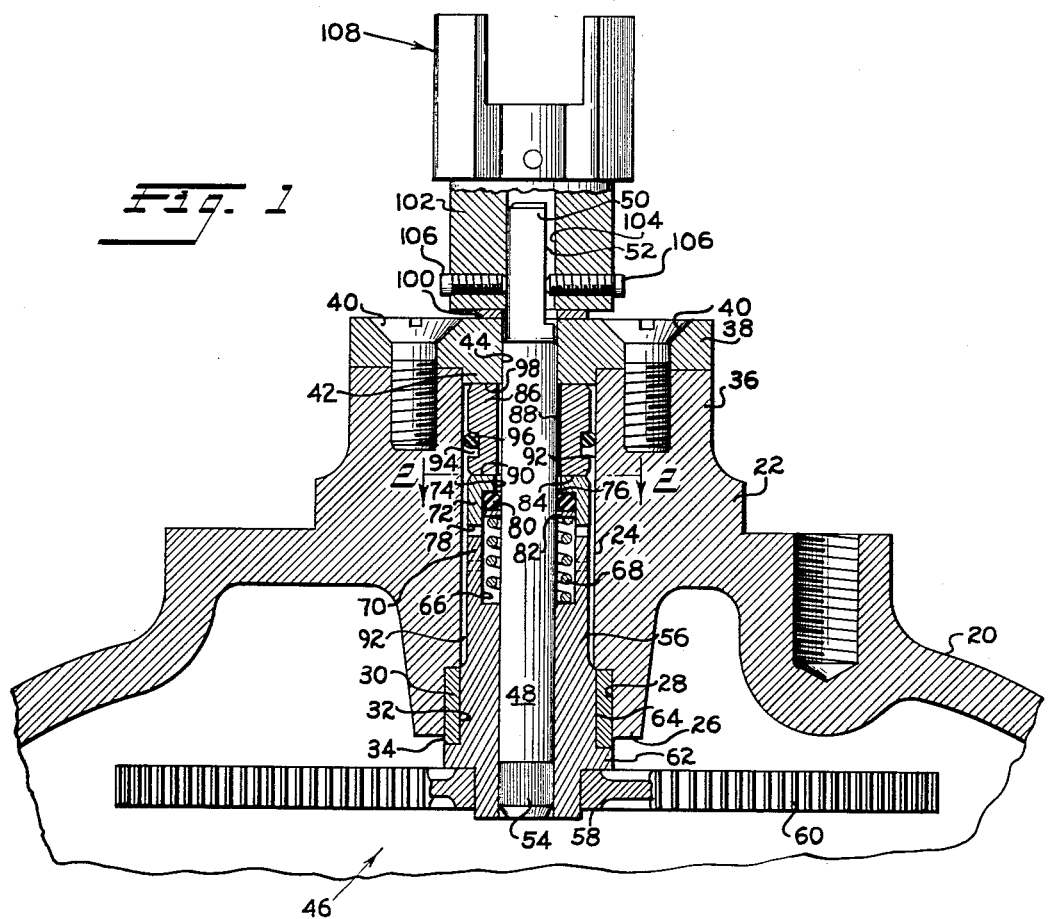
Fig. 1
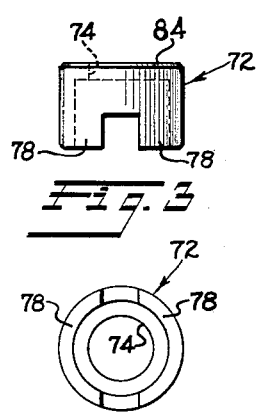
Fig. 3
Fig. 4
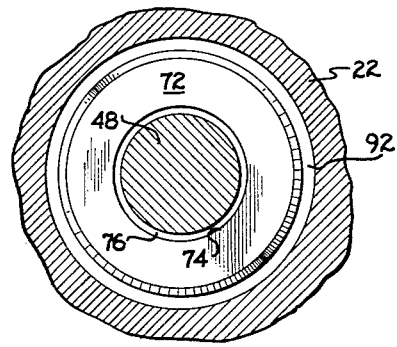
Fig. 2
INVENTOR
GEORGE E. BATCHELDER
BY *Strauch, Nolan + Diggins*
ATTORNEYS

United States Patent Office 2,712,461
Patented July 5, 1955

2,712,461

ROTARY SHAFT SEAL

George E. Batchelder, Pittsburgh, Pa., assignor to Rockwell Manufacturing Company, Pittsburgh, Pa., a corporation of Pennsylvania Application May 28, 1952, Serial No. 290,439

2 Claims. (Cl. 286—11.15)

This invention relates to fluid seals for rotary shafts or spindles and particularly to an efficient fluid seal for use in high fluid pressure metering apparatus.

In apparatus subject to high fluid pressure, such as liquid propane gas meters, it is necessary to provide a gastight seal between the rotating driven shaft and its support, but the seal must be one which will not produce appreciable frictional drag on the rotating shaft. This is particularly important in mechanisms such as flow meters which have low power and wherein accuracy of flow indication is essential.

It is a major object of this invention to provide a novel fluidtight seal for a rotary shaft wherein accuracy of operation is assured due to the reduction of friction to an extent where it is no longer a factor in proper operation.

Another object of this invention is to provide a fluidtight seal for a rotary shaft wherein the elements of the seal are self-adjusting and aligning to assure perfect sealing.

Still another object of this invention is to provide a novel fluid seal embodying relatively rotatable members having a low friction running seal therebetween and positive driving means to drive one member relative to the other.

A further object of this invention is to provide a self-adjusting positive drive for the rotatable member in order to assure perfect sealing of the relatively rotating members.

A still further object of this invention is to provide a fluidtight seal having a pair of relatively rotatable members forming a running seal and resilient packings for said members statically mounted in the device so that there is no frictional wear of the packings.

A further object of this invention is to provide a novel gastight shaft seal embodying two members resiliently urged together longitudinally and having flat smooth faces in relatively sliding contact, with one member statically sealed to the shaft and the other member statically sealed to the housing bore.

Further objects of the invention will presently appear as the description proceeds in connection with the appended claims and the annexed drawings wherein:

Figure 1 is an axial sectional view through a stuffing box illustrating a preferred embodiment of the invention;

Figure 2 is a section along the line 2—2 of Figure 1 in the plane of the running seal.

Figure 3 is a side elevation of the axially movable element of the seal; and

Figure 4 is a bottom view of that element.

Referring to Figure 1, a cup shaped cover 20 is adapted to be attached to a meter housing (not shown). Cover 20 has an elongated central boss 22 containing an axially extending uniformly cylindrical bore 24. The inner end 26 of boss 22 projects within the cover and is formed with an enlarged annular end recess 28 concentric with bore 24. Seated within recess 28 is a bronze bushing 30 having an inside diameter 32 which is the same as bore 24, thus giving the effect of one continuous bore through boss 22. Bushing 30 has a portion 34 extending a small distance beyond the inner end 26 of boss 22.

The outer end 36 of boss 22 projects outwardly of the cover and a rigid end plate 38 is secured to cover 20 across the end of the boss, as by screws 40.

Plate 38 has a boss 42 extending into and in close fitting relation with the bore 24 and a cylindrical through bore 44 concentric with and of smaller diameter than bore 24.

A sealed drive assembly is generally indicated at 46 and consists of a shaft or spindle 48 of uniform cylindrical cross-section provided at its upper end with a reduced portion 50 having a flat side surface 52. At its lower end spindle 48 is provided with a series of spline teeth 54 about its periphery.

A hollow steel sleeve 56 surrounds the lower end of and is secured to spindle 48 by a force fit on the spline teeth 54. At its lower end the sleeve 56 is reduced as at 58 and a gear 60 is fixedly secured on the sleeve in abutting relation with an enlarged flange 62. Thus the spindle 48, sleeve 56 and gear 60 rotate as a unit.

Above flange 62 the sleeve is formed with a cylindrical portion 64 equal in length to that of bearing 30 in which it is journaled while the remaining length of sleeve 56 is of smaller diameter than the bore 24 and projects upwardly toward plate 38. An inwardly extending open annular recess 66 is provided in the end of sleeve 56 remote from gear 60. This recess houses part of a coiled compression spring 68 which freely surrounds shaft 48 within recess 66 and seats against the bottom of recess 66.

The inner end of sleeve 56 is also provided with a positive coupling portion or jaw clutch element having two teeth 70 extending longitudinally of the shaft.

A short cup-shaped thimble 72, having a central bore 74 that is sufficiently larger to provide a definite clearance 76 with the spindle, is mounted about the spindle. This thimble is illustrated in Figures 3 and 4 and is of the same diameter as the upper portion of sleeve 56 so as to have ample clearance with respect to bore 24. The end of the thimble adjacent sleeve 56 is provided with a positive coupling portion comprising jaw clutch teeth 78 in mesh with teeth 70 of sleeve 56 so that rotation of sleeve 56 positively rotates the thimble 72. The teeth 70 and 78 are straight sided and of sufficient relative length to permit some degree of slidable axial displacement of thimble 72 with respect to sleeve 56 without interrupting the positive drive therebetween, for a purpose to appear.

Seated at the bottom of the thimble 72 is a resilient static fluid seal 80, such as a rubber O-ring seal, which is a normally circular ring of synthetic rubber of circular cross-section having its inner periphery in contact with the periphery of the spindle 48 and its outer periphery in contact with the inner side wall of thimble 72. Washer 82 fits loosely about shaft 48 and is urged by spring 68 against the O-ring 80 to deform the latter radially outwardly and inwardly and thereby creating a static leakproof seal between the thimble and the spindle. By virtue of the clearance between the thimble bore 74 and the spindle and the loose fit of washer 82, the only support for the thimble is the static seal. As a result of this single support, the thimble is free to rock slightly with respect to the shaft axis for centering purposes, the advantages of which will become apparent.

The end face 84 of thimble 72 is normal to its axis and has a smooth lapped mirror finish. Thimble 72 is preferably made of stainless steel hardend to 55–60 Rockwell C-scale. A stationary ring 86, having a central bore 88 of sufficient size to permit free rotation of the spindle, surrounds the spindle between the thimble and end plate 38. Ring 86 has an end face 90 that is normal to the axis of bore 88 and which has a smooth lapped mirror finish in sliding contact with face 84. Ring 86 is preferably of beryllium copper to reduce to a minimum the sliding friction at faces 84 and 90. The periphery of ring 86 is of sufficiently smaller diameter than the bore 24 to provide a clearance 92 when the ring is disposed in the bore 24. This clearance is the same between the bore 24 and the thimble 72 and the unjournaled upper portion of sleeve 56. An annular groove 94 is provided in the periphery of ring 86 for the reception of a resilient static seal, such as rubber O-ring 96. The upper non-sealing face 98 of ring 86 which abuts plate 38 is not a mirror finish for reasons that will become apparent from the following description of operation.

The foregoing elements of the seal assembly are mounted on the spindle and inserted into the bore 24 from the end 26 of boss 22 until the non-sealing face 98 of stationary ring 86 abuts the inwardly disposed face of boss 42. O-ring 96 is thus compressed between the wall of bore 24 and the base of the annular groove 94, thereby creating a static gas tight joint between the cover and ring 86. Further O-ring 96 is the sole side support for seal ring 86 and by virtue of clearance 92 and the loose fit of ring 86 about the spindle 48 the ring 86 is allowed some degree of lateral floating and angular canting with respect to spindle 48 in order that sealing face 90 can properly adapt itself into full surface contact with sealing face 84 of thimble 72.

Thimble 72 is also capable of a degree of lateral floating and angular canting, since it is in effect supported solely by O-ring 80, and because of the clearance 92 between the bore 24 and thimble 72 and the clearance 76 between the thimble and the spindle. By virtue of the longitudinally slidable engaged toothed coupling between thimble 72 and sleeve 56, the thimble is capable of longitudinal movement to adapt its sealing face 84 to sealing full surface contact with sealing face 90 under the biasing effect of spring 68. The amount of spring force urging the sealing faces together can be controlled by the use of suitable spacers placed between spring 68 and sleeve 56. Sleeve 56 in the assembled position is spaced from the bore 24 by the amount of clearance 92 with the exception of the journal portion 64 which is coextensive with and has a running fit with the bronze bearing 30. Flange 62 is in rotating contact with the protruding portion 34 of the bronze bushing 30, which takes any end loads impressed on the assembly by the internal fluid pressures. When the assembly 46 is in the assembled position, the upper end 50 of the spindle extends through and beyond the bore 44 of plate 38. A thrust washer 100, usually of bronze, fits loosely over shaft portion 50 to form a thrust bearing surface for the face of a coupling 102 mounted on shaft portion 50 as by bore 104 and set screws 106. Screws 106 clamp the spindle therebetween so that the spindle and coupling rotate together. The uppermost end of coupling 102 is provided with means generally designated 108 for engaging and driving the shaft of a recording devise or the like (not shown). It will be noted that after the spindle and seal assembly is thrust into the bore until flange 62 engages the end of bushing 30, attachment of coupling 102 will hold the assembly on the cover, and the amount of compression of spring 68 and consequently the degree of pressure at surfaces 84 and 90 is thereby predetermined.

*Description of operation*

In operation, gear 60 is driven from the flow responsive element of the meter and gear 60, sleeve 56 and spindle 48 rotate as a unit. By virtue of the toothed engagement of sleeve 56 with thimble 72, the latter is also rotated with the drive member while having freedom of longitudinal movement so that spring 68 can urge the sealing face 84 against face 90. Ring 86 is held stationary with respect to spindle 72 and spindle 48 since friction between face 98 and the inwardly disposed face of boss 42 as well as the frictional engagement of O-ring 96 with the bore 24 and ring 86 is more than adequate to resist the very small torque created by the relative rotation of face 84 against face 90.

Both of the O-rings 80 and 96 are under a degree of axial compression and radial expansion when in their assembled position, thereby effectively preventing any longitudinal leakage past the surfaces between which they are disposed even when under no appreciable pressure from within. However, as the pressure from within is increased, the effectiveness of the seal will increase, since the force exerted on the seals causes a more intimate contact between the compressed O-rings and boundary walls.

Radial leakage at the running seal is effectively inhibited by the intimate full surface contact of the mirror finished faces 84 and 90. By virtue of the relative floating and tilting action which this structure permits, perfect surface contacting of the respective faces of ring 86 and thimble 72 is assured, which consequently results in an ideal rotating seal. The sealing qualities of this rotating joint improve with operation since the continued operation results in effective lapping of the relatively rotating surfaces. The coefficient of friction as well as the heat generated by these relatively movable surfaces is kept at a minimum by the choice of materials for the ring 86 and thimble 72. Such materials as hard steel running against a carbon or graphite member or a beryllium copper member have been found to give excellent results. However, this invention is not limited to such choices but can be employed with any combination of low friction materials, subject only to the limitations imposed by the fluid to be sealed.

It will be noted that in this invention there is no relative rotation of the O-rings thereby assuring a greater life span since wear due to rubbing or loss of effectiveness because of hardening due to the generation of excessive heat is eliminated. As a result, the full benefits of the resilient nature of these O-rings is utilized for sealing and floatingly mounted their respective seal elements. Further the sealing qualities of the device are enhanced by the single low coefficient of the running joint.

It has been found, in practice, that the rotating shaft seal described in the foregoing provides an effective inhibition to fluid leakage while reducing frictional resistance on the spindle to the point that, for all practical purposes, resistance is eliminated as a factor bearing upon efficient operation of the fluid responsive mechanism driving the spindle and accurate registration thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a support having a bore, a shaft rotatable within said bore, and means for sealing against leakage of fluid through the bore comprising an annular seal member within said bore and surrounding said shaft, said seal member having sufficient radial clearance relative to said shaft and bore to allow substantial axial tilting and radial movement of said seal member, a static resiliently deformable O-ring surrounding and providing floating support for said member in said bore and sealing the clearance between said member and bore, a second annular seal member surrounding said shaft with sufficient radial clearance relative thereto to allow substantial axial tilting and radial movement of said second seal member, said seal members both having opposed smooth flat radial surfaces in contact in a plane normal to the axis of rotation of said shaft, said second seal member being thimble-shaped having a hollow cylindrical portion extending away from said surfaces and terminating in a toothed end, a cylindrical sleeve fixed to said shaft and having a toothed end engaged with the toothed end of said thimble-shaped member for operatively connecting the sleeve and thimble-shaped member for unitary rotation while permitting relative axial sliding of the latter, a second static resiliently deformable O-ring surrounding said shaft and disposed within the cylindrical portion of said thimble-shaped seal member, a single compression spring surrounding said shaft and reacting between said sleeve and said second O-ring to bias said thimble-shaped seal member into contact with said first seal member and to deform said second O-ring into intimate sealing relation with said shaft and thimble-shaped seal member.

2. In combination: a housing having a circular opening therethrough and means forming an end wall for said opening provided with a bore coaxial with said opening; a shaft passing through and rotatable within said opening and said bore; a first and a second member mounted about the shaft within the housing opening in free floating and free tilting relation with respect to said shaft and housing, said first member comprising a sleeve with one end abutting said end wall, having an inner diameter greater than the shaft diameter and an outer diameter less than the diameter of the housing opening to provide a clearance between the member and the shaft and housing, an annular groove circumscribing its outer surface and its other end provided with a smooth plane surface normal to its axis; a resilient seal ring disposed in said groove between the base of said groove and the cylindrical wall of said housing opening and providing a floating support for said first member and effecting a static seal between the first member and the housing; said second member comprising a cup shaped thimble having an aperture through its bottom affording a clearance between the shaft and the thimble, side walls having external dimensions affording a clearance between the housing and the thimble, and the thimble bottom being a smooth plane surface normal to the thimble axis and in intimate sealing contact with the plane surface of said first member; a second resilient seal ring disposed within said thimble and engaging the side wall of said thimble and the shaft to effect a static seal between the thimble and said shaft and providing a floating support of said thimble relative to said shaft; a journal sleeve fixed to one end of said shaft and journalled in said housing opening; spring means between said journal sleeve and said second resilient seal ring deforming said seal ring into radial sealing engagement with the inside of said thimble and said shaft and urging the plane surface of the second member into rotative sealing engagement with the plane surface of the first member; radially and axially displaceable coupling means between the journal sleeve and said second member to enable said shaft, journal sleeve and second member to rotate as a unit; and means fixed to the other end of said shaft and engaging said end wall to retain the shaft and seal element in said housing opening.

References Cited in the file of this patent

UNITED STATES PATENTS

| | | |
|---|---|---|
| 1,958,246 | Olson | May 8, 1934 |
| 2,362,854 | Stephens | Nov. 14, 1944 |
| 2,395,705 | Wool | Feb. 26, 1946 |
| 2,405,464 | Storer | Aug. 6, 1946 |
| 2,411,509 | Endebak | Nov. 26, 1946 |
| 2,455,700 | Porges | Dec. 7, 1948 |
| 2,479,711 | Arutunoff | Aug. 23, 1949 |
| 2,489,212 | Zwack | Nov. 22, 1949 |
| 2,554,595 | Smith | May 29, 1951 |
| 2,575,549 | Doble | Nov. 20, 1951 |
| 2,619,040 | Maisch | Nov. 25, 1952 |